March 29, 1927.

A. A. CAILLE 1,622,571

WEIGHING SCALE

Filed Oct. 4, 1924

7 Sheets-Sheet 1

*Fig. 1.*

INVENTOR.
Adolph A. Caille
by Edward N. Pagelsen
ATTORNEY.

March 29, 1927. 1,622,571
A. A. CAILLE
WEIGHING SCALE
Filed Oct. 4, 1924 7 Sheets-Sheet 2

INVENTOR.
Adolph A. Caille
by Edward N. Pagelsen.
ATTORNEY.

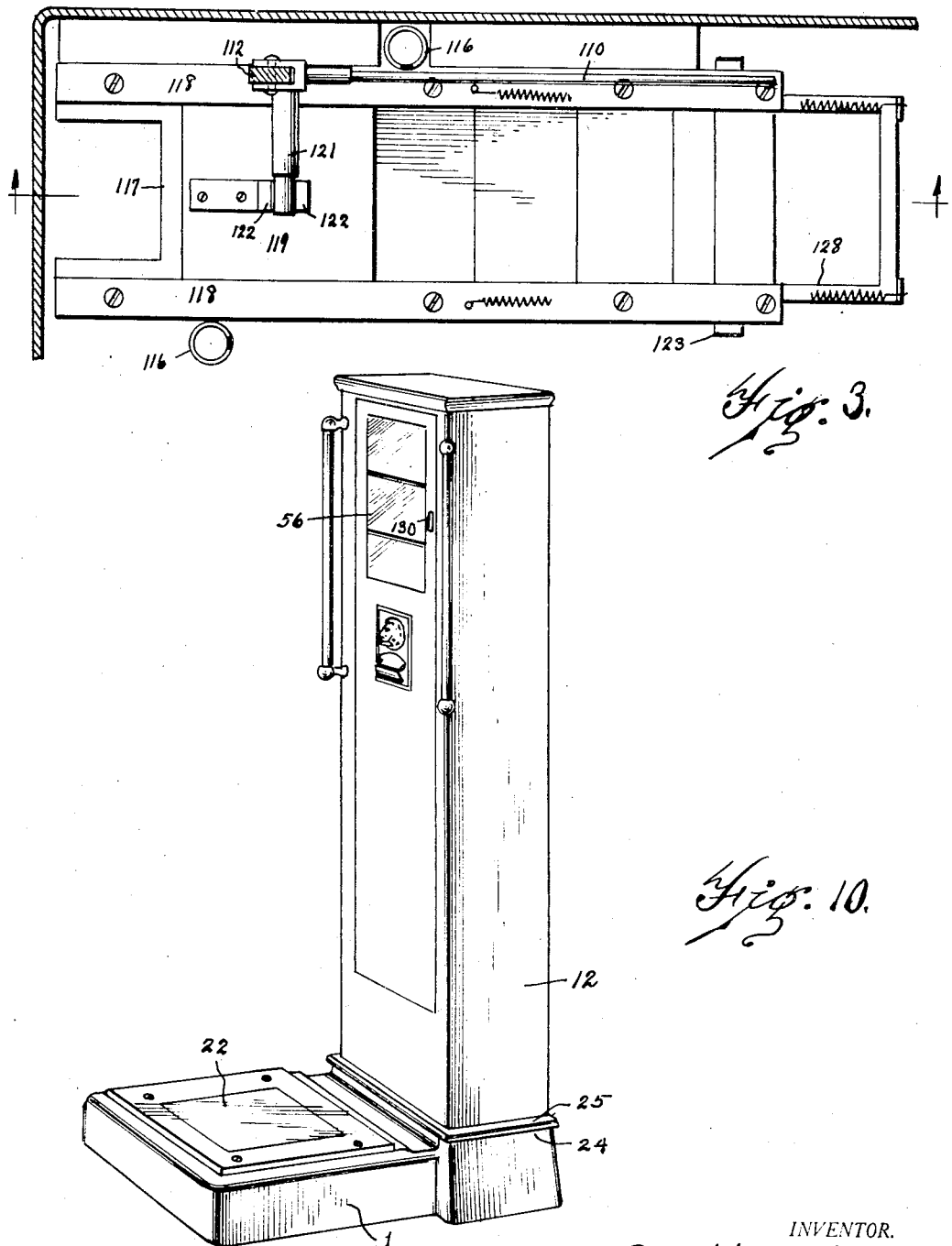

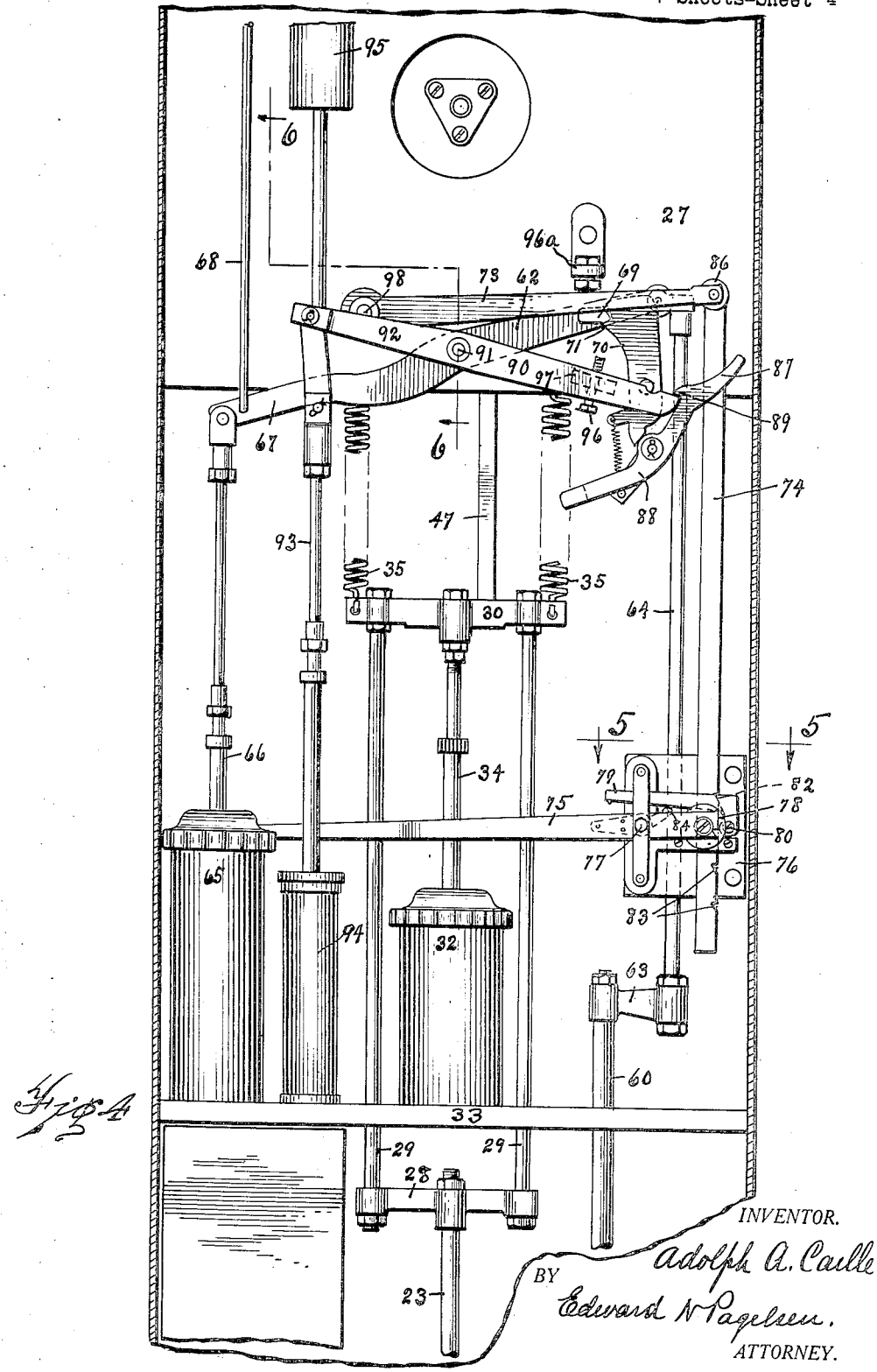

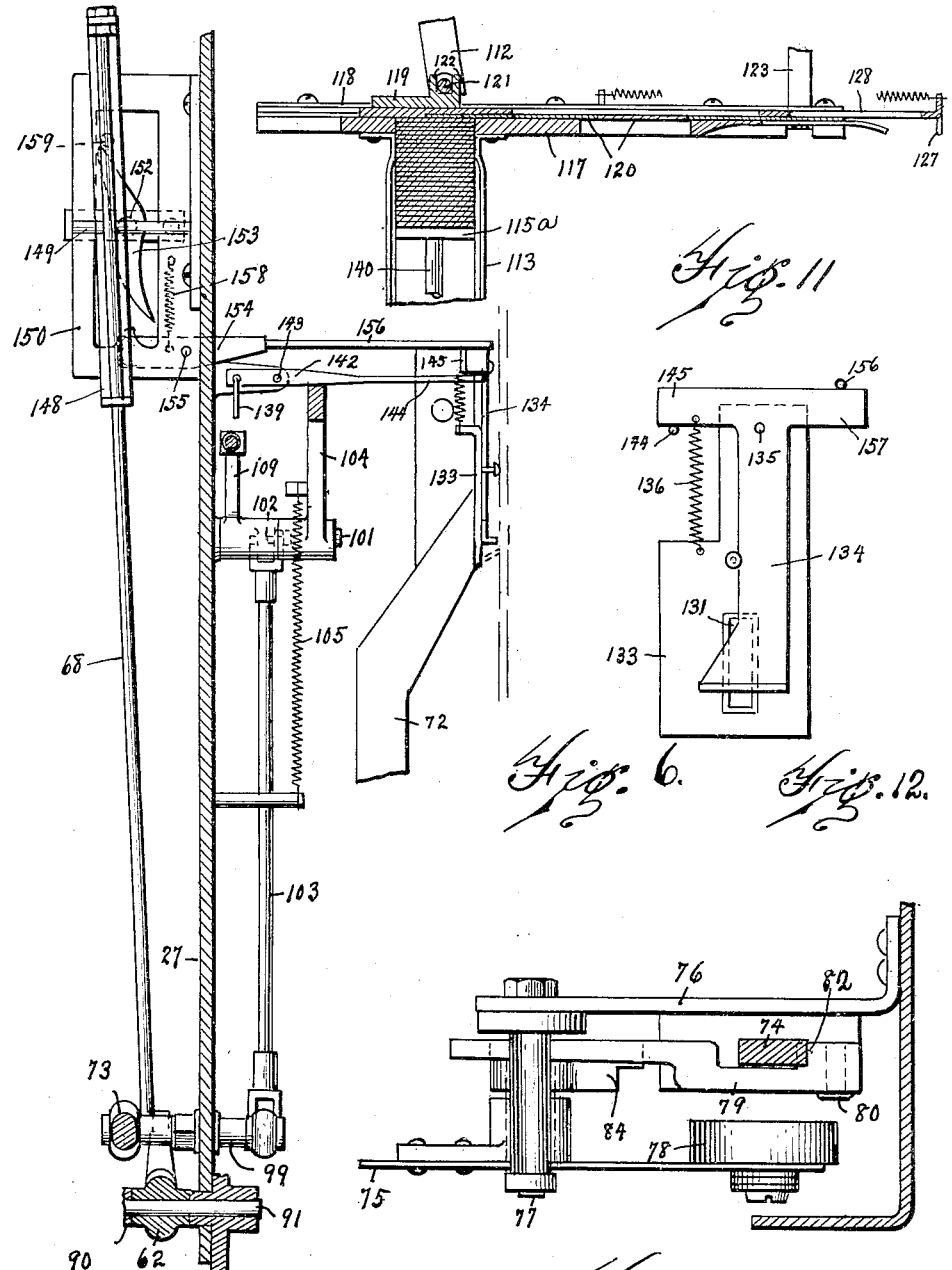

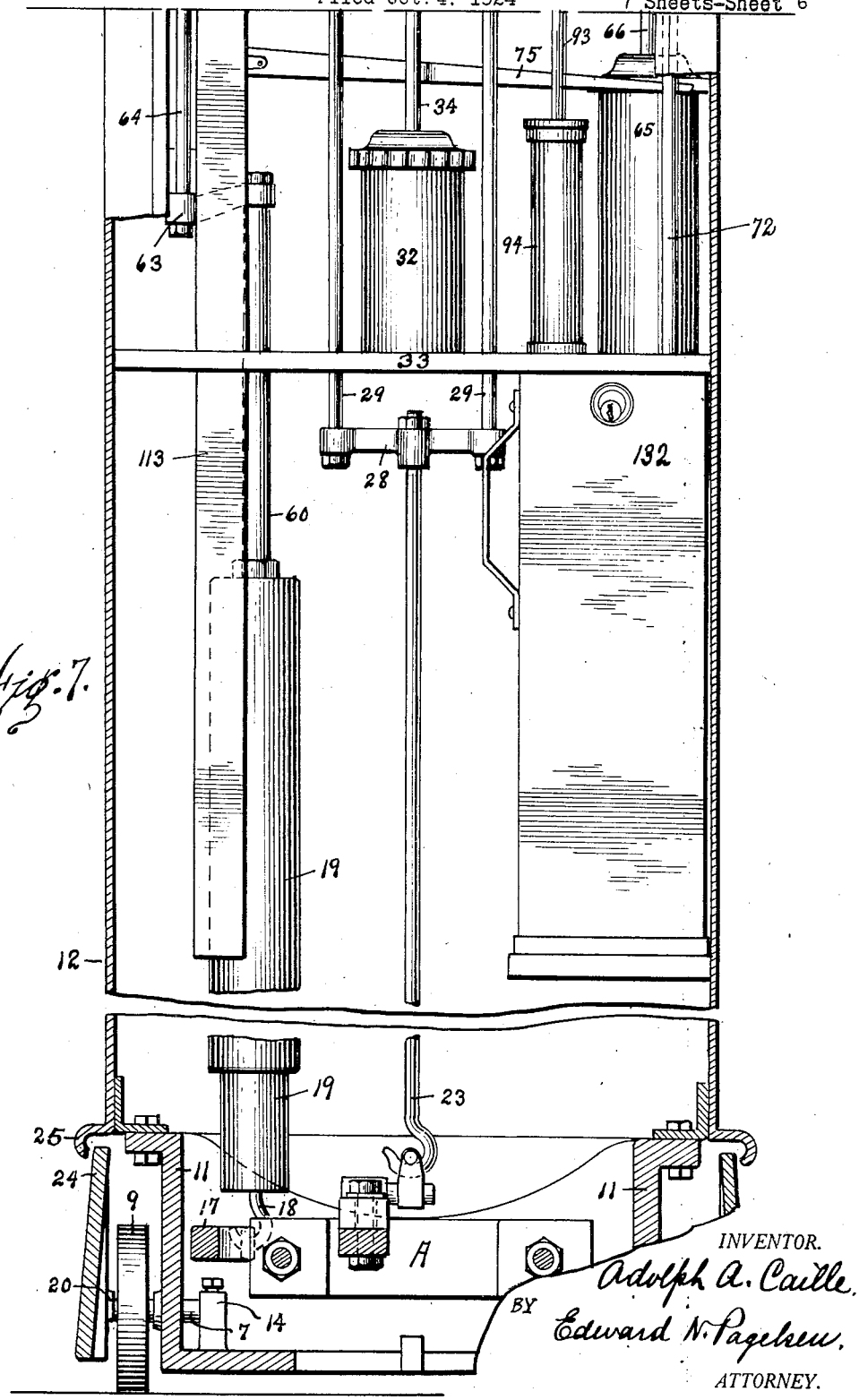

March 29, 1927.

A. A. CAILLE

WEIGHING SCALE

Filed Oct. 4, 1924

1,622,571

7 Sheets-Sheet 7

INVENTOR.
Adolph A. Caille
BY
Edward N. Pagelsen
ATTORNEY.

Patented Mar. 29, 1927.

1,622,571

UNITED STATES PATENT OFFICE.

ADOLPH A. CAILLE, OF DETROIT, MICHIGAN.

WEIGHING SCALE.

Application filed October 4, 1924. Serial No. 741,601.

This invention relates to scales especially designed to weigh persons, and its object is to provide a weighing mechanism of this character which shall accurately print the weight of the individual on the scale upon the insertion of a proper coin.

This invention comprises an ordinary lever mechanism and weight resisting springs, together with a disk which rotates in proportion to the load on the lever mechanism, a tiltable base containing the lever mechanism, counterweights which are positioned by the tiltable base, printing mechanism adapted to be actuated by the counterweights, and means whereby the insertion of a coin will release the counterweights and so cause the printing of the weight of the individual on the scale upon a proper ticket.

It further consists of the details of construction illustrated in the accompanying drawings and particularly pointed out in the claims.

Figure 2:
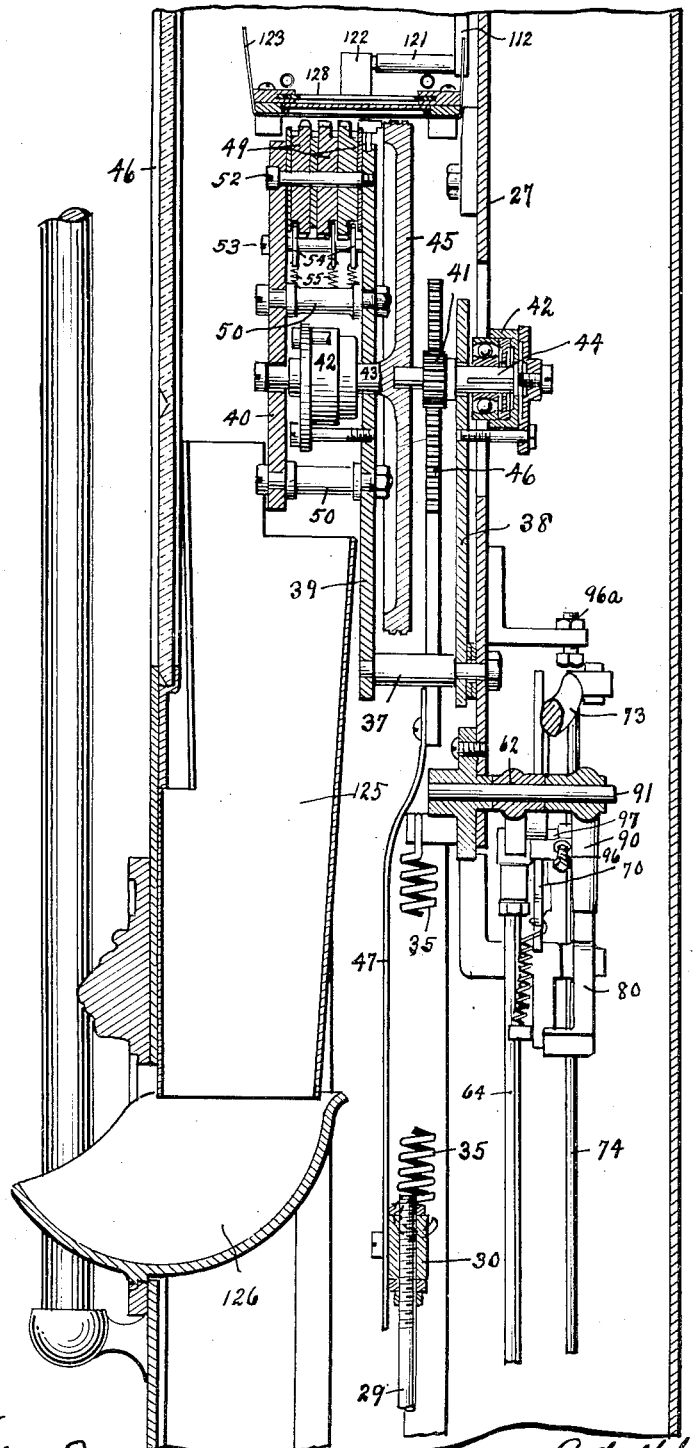
Figure 8:
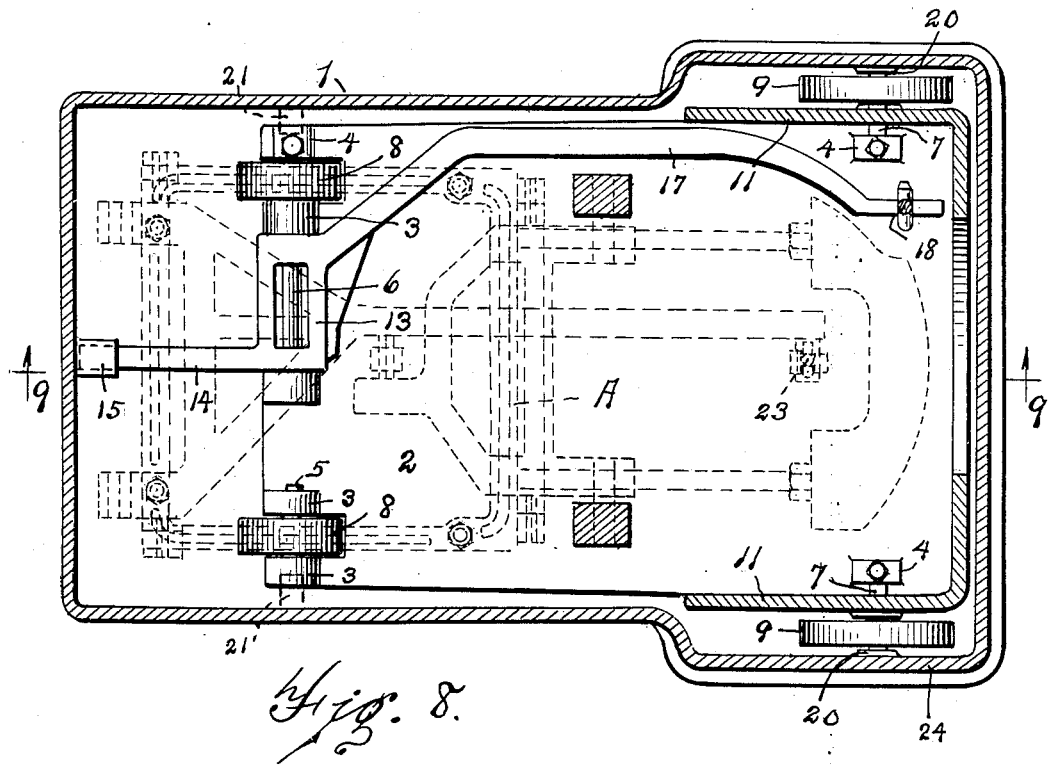
Figure 9:
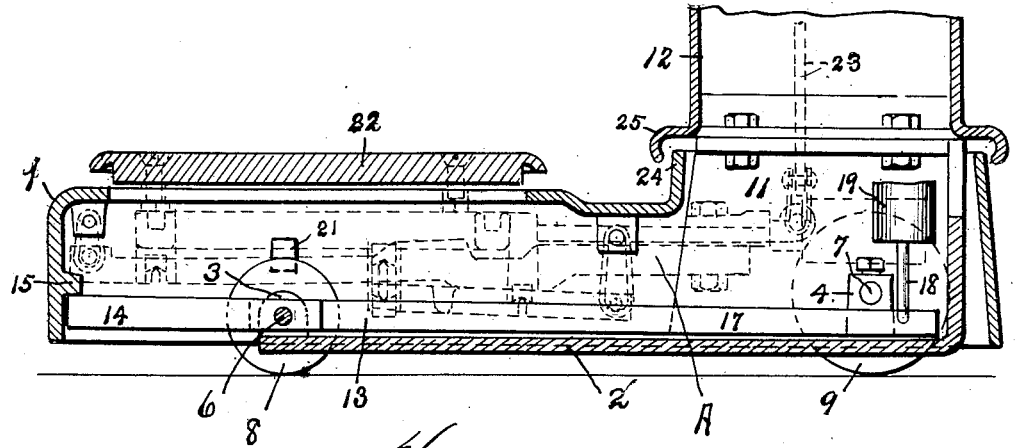

In the drawings, Fig. 1 is a front elevation of the mechanism in the upper portion of the scale case. Figs. 2 and 3 are sections on the lines 2—2 and 3—3 of Fig. 1. Fig. 4 is a rear elevation of a portion of this weighing mechanism. Figs. 5 and 6 are sections on the lines 5—5 and 6—6 of Fig. 4. Fig. 7 is a front elevation of the lower portion of this mechanism. Fig. 8 is a plan of the support for the lever mechanism. Fig. 9 is a section on the line 9—9 of Fig. 8. Fig. 10 is a perspective view of this improved weighing scale. Fig. 11 is a vertical section of the device for positioning the tickets. Fig. 12 is a detail of the control for the coin chute.

Similar reference characters refer to like parts throughout the several views.

The load receiver.

This weighing scale differs but little in general outside appearance from scales already in use but its base 1 is separate and apart from the carriage (Fig. 9) which comprises a bottom plate 2 and lugs 3 and 4 which support the shafts 5, 6 and 7 for the wheels 8 and 9, and the flanges 11 which support the pedestal 12 of the scale.

The shaft 6 carries a supporting lever 13 whose short arm 14 extends beneath the lug 15 on the base 1 and whose long inner arm 17 connects to the printing mechanism by means of a link 18 and weight 19. The inner ends of the sides of the base are provided with bearings 20 (Fig. 8) which receive the outer ends of the shafts 7. A platform 22 is mounted on a lever mechanism A of any desired character, that shown in my prior Patent No. 1,473,696, dated November 13, 1923, being preferred, and by this lever mechanism the correct proportion of the force of the weight on the platform is transmitted to the rod 23 and by it to the load resisting and indicating mechanism.

When a person steps onto the platform 22, a portion of this weight is transmitted to the base 1 in the usual manner through the lever mechanism, and this base rocks on the shafts 7, the base being provided with bearings 20 for the ends of these shafts, until the lugs 21 on the inside of the base contact with the outer bearings 3 and 4 of the shafts 5 and 6. The flanges 25 on the pedestal extend over the flanges 24 on the base and prevent entrance of dirt. The angular distance through which this base rocks is always the same and the lever mechanism and the platform are so designed that their regular weighing plane is had when the base is thus tilted. The base has four points of support, the outer ends of the shafts 7 and the two wheels 8, so that the base does not rock while a person is on the platform. The inner arm 17 of the lever 13 always rises the same distance and the mechanism connected thereto sets the printing mechanism which acts when a proper coin is inserted.

The weighing mechanism.

The pedestal 12 is a case of any desired shape, and within it is a rigid supporting plate 27 on which nearly all of the parts of the printing and weight indicating mechanisms are mounted. This rod 23 connects to a cross bar 28 and two rods 29 extend upward from this cross bar to a second cross bar 30. A dash pot 32 is mounted on a cross bar 33 within the pedestal and the usual piston rod 34 extends down from the cross bar 30 to the piston (not shown) within the dash pot. Load resisting springs 35 extend from the cross bar 33 to the supporting plate 27.

Referring now to Figs. 1 and 2, the posts 37 extend from the plate 27 and carry spaced frame plates 38 and 39. Other posts 50 on the plate 39 carry the small front plate 40. The plates 38 and 39 support roller bearings 42 for the alined shafts 43 and 44 which connect to the disk 45. On the shaft 44 is a pinion 41 which meshes with the rack bar 46 connected at its lower end to the upper end of the link 47 which is attached to the cross bar 30.

The disk 45 therefore turns in proportion to the load on the platform. Its periphery is formed into printing numerals and the zero mark is uppermost when the base 1 is swung down without placing any pressure on the platform. As soon as any weight is placed on the platform, this disk is turned through the medium of the lever mechanism A, rods 23 and 29, link 47, rack bar 46 and pinion 41.

The dating mechanism.

A person being weighed often desires not only a printed memorandum of his weight but also of the date. In order to print this on the same ticket with the weight, I mount the dating wheels 49 of any well known construction on the shaft 52 carried by the plates 39 and 40 and mount the friction levers 54 on the small shaft 53. These levers are pressed against the dating wheels by means of springs 55 and thus restrain these wheels from turning. When the front door 56 is opened, these wheels can be properly positioned.

The printing mechanism.

As stated before, when the base 1 is tilted by a person on the platform, the printing mechanism is set for operation. But no printing takes place until this mechanism is released by the insertion of a proper coin. The weight 19 connects to a rod 60 and that rod connects to the main lever 62 by means of the cross bar 63 and the rod 64. The movements of these parts are dampened by the dash pot 65 and a piston rod 66 connecting to the arm 67 of this main lever. A link 68 extends upward from this arm 67 to the mechanism for controlling the insertion of the coins to prevent such insertion until the base 1 has been depressed.

When the base is depressed, the main lever 62 is swung up to the position shown in Fig. 4, the lug 69 on this lever sliding along the curved face of the pawl 70 until it passes the shoulder 71. The lever arm 73 carries the trip link 74 which extends down to the tripping mechanism. A small plate 76 carries the pivot 77 for the trip lever 75 which has one end extending into the coin chute 72 and has a counterweight 78 on the other end. A dog 79 is pivoted at 80 and has a tooth 82 on its front side adapted to enter the notches 83 in the trip link. This dog and the trip link 74 hold the lever arm 73 elevated until the trip lever 75 swings down and the finger 84 attached thereto near its pivot engages the dog 79 and swings it to inoperative position, permitting the link 74 to drop.

When the roller 86 on the end of the lever 73 reaches the curved upper end 87 of the dog 88, the tooth 89 thereon is swung out of engagement with the end of the lever 90 which is pivoted at 91. The opposite arm 92 of this lever connects to the piston rod 93 of the dash pot 94 and also carries a heavy weight 95 which is sufficient to swing up the lever 73 and the trip link 74, this distance being controlled by the set-screw 96 and the stop 96ª. This set screw 96 is carried by a lug 97 which is adapted to slide along the inner edge of the pawl 70 to swing it outwardly to release the lug 69 on the main lever 62. The lug 97 on the lever 90 is the element which engages the lever 73 after the pawl 70 has been swung back by this lug. The lever 73 is mounted on a shaft 98 and a second lever 99 is attached to this shaft on the front side of the plate 27 (Fig. 1) and this lever 99 actuates the printing mechanism when it swings up, that is, when the trip link 74 slides down.

When a person stands on the platform, the weight 19 is moved up and the lever 62 swings to the position shown in Fig. 4, being held there by the pawl 70. All the other parts were in the position shown in that figure when the last previous person stepped off the platform. When a coin in the chute swings down the lever 75, the trip link 74 and lever 73 move down. The dog 88 is swung out to release the lever 90 and the weight 95 immediately swings up this lever 90 to carry the lever 73 and the trip link to the positions shown in Fig. 4.

Therefore, upon the insertion of the coin, the lever 73 is swung first down and then up and the lever 99 connected thereto is swung up and then down. The pawl 70 is now swung outward to release the main lever 62 and when the person steps off the platform, this lever swings down and the lug 69 thereon engages the lug 97 on the lever 90 and swings down this lever until its end is below the tooth 89 of the dog 88. Attention is called to the fact that the person on the platform merely sets the main lever 62 and that when he leaves the platform the weight 19 acts to swing down this lever and also the lever 90 to elevate the somewhat lighter weight 95. This weight 95 actuates the printing mechanism, the remainder of the mechanism just described merely insures operation under proper conditions.

As stated above, the lever arm 99 moves up and then down upon the insertion of a coin. Mounted on the shaft 101, (Fig. 6) is a lever arm 102 (Fig. 1) which is connected to the lever arm 99 by a link 103. A hammer 104 (Fig. 1) is also mounted on this shaft and is adapted to be swung down by the spring 105 and to be swung back up by a pin 106 carried by the lever arm 102, which pin engages the finger 107 extending from the hub of the hammer arm. The head of this hammer is sufficiently wide to extend across the faces of all the disks 45 and 49. When therefore the lever arm 99 moves up, the hammer swings down and it strikes a ticket which is guided above these disks by means of mechanism actuated by the arm 109 extending from the hub of the small lever arm 102, the link 110 and the swinging arm 112.

The tickets are carried in a case 113 which is open at the top and has a filling door 114. The tickets are pressed up by the cross bar 115 and springs 116, a rod 140 connecting to this cross bar and to the plate 115ª shown in Fig. 11. A guide consisting of a base plate 117 and gibs 118 receives the carriage 119 (Figs. 3 and 11) which has a recess in its lower side of proper size to receive a ticket 120 which is moved slightly more than its width toward the printing wheels at each swing of the swinging arm 112 which carries a pin 121 at its lower end, this pin extending between the ears 122 on the carriage. As will be seen from Fig. 1, this movement of the carriage toward the printing wheels occurs as the hammer 104 rises, that is, after the printing, so that the printed ticket is pushed off the printing wheels after being printed.

The inking ribbon 123 passes under the ticket guide onto rollers 124 which are turned in any desired manner. After the tickets leave the guide they fall into a chute 125 and into a cup 126 carried by the front of the case. The fingers 127 (Fig. 11) on a spring-held frame 128 prevent the tickets from sliding out too far.

The coins are passed through a slot 130 (Fig. 10) into the opening 131 (Fig. 12) at the upper end of the coin chute 72 through which they slide to the container 132. It is desirable to prevent the entrance of the coin before the scale is in proper position for weighing and when the ticket chute is empty.

I secure a plate 133 at the upper end of the coin chute and this plate has the slot 130. A door 134 is pivoted at 135 on this plate and its lower end normally covers the slot 130 but a spring 136 tends to swing this door out of the way. A lever 137 is pivoted at 138 on the plate 27 and one arm extends into the path of the cross bar 115 so that when the tickets are exhausted this end of the arm swings up and the other end and the link 139 moves down. The link 139 connects to a lever 142 (Fig. 6) pivoted at 143, and the outer arm 144 extends beneath the arm 145 on the plate 134 and holds the plate over the slot 131 until the ticket receptacle is again filled.

Fig. 6 shows the link 68 connected to the main lever 62. This lever swings with the base 1 and the upper end of the link 68 is guided in a frame 148 which is transversely slidable on a pin 149 carried by a bracket 150. This bracket also supports a pin 152 on which the latch 153 is pivoted. A lever 154 is pivoted at 155 and its long arm 156 extends over the part 157 of the plate 134 and holds this plate over the slot 131 through the pull of the spring 158.

When the base 1 is swung down, the arm 67 of the lever 62 swings down and the pin 159 carried by the link 68 slides down from the position shown in Fig. 6 along the inner side of the latch 153 until it strikes the short end of the lever 154 and raises the arm 156 to permit the spring 136 to swing the plate 134 from over the slot 131. When the pin 159 passes the lower end of the latch, that swings inward so that when the pin rises it slides up along the outer side of the latch. If now another person gets onto the platform before the base 1 has reached normal position, this pin will slide down on the rear side of the latch and never reach the lever 154 which through the action of the spring 158 holds the plate 134 over the slot 131. The scale cannot therefore receive a coin until all parts have first returned to normal position, which means until the printing mechanism has been reset.

While no coin can be inserted until the base has been swung down, it is desirable to wait until the springs 35 have stopped vibrating. A small dial 160 is mounted adjacent the printing wheel 45, as shown in Fig. 1, and carries the shaft 161 for the hand 162. A roller 163 on this shaft contacts with the wheel 45 and only comes to rest when the wheel 45 has stopped oscillating.

The details of construction and the proportions of the parts may all be changed by those skilled in the art without departing from the spirit of my invention as set forth in the following claims.

I claim:—

1. In a weighing scale, a support, a scale base adapted to tilt up and down thereon and containing the scale levers and supporting a platform, weight indicating mechanism embodying a printing wheel and means connecting said printing wheel to the levers, printing mechanism adapted to co-operate with said wheel, a weight to actuate the printing mechanism, means to retain the weight in elevated position, a second weight connected to the base and raised by the base when swung down by a person on the platform which weight in moving downward is adapted to raise the first weight, and means for releasing said first weight to actuate the printing mechanism.

2. In a weighing scale, a support, a scale base adapted to tilt up and down thereon, and containing the scale levers and supporting the platform, load resisting springs and a printing wheel and means connecting said printing wheel to the levers, printing mechanism and a weight to actuate the printing mechanism, connections between the base and weight whereby the weight is positioned by said base, means to retain the weight when so positioned, and a releasing device to permit the operation of the printing mechanism by said weight.

3. In a weighing scale, a support, a scale base adapted to tilt up and down thereon, a printing mechanism and a weight to actuate the printing mechanism, connections between the base and weight whereby the weight is positioned by the base, means to retain the weight when so positioned, and means to release the weight to permit the operation of the printing mechanism, said connections embodying a second weight sufficiently greater than the first to elevate it as the base tilts to normal position.

4. In a weighing scale, a support, a scale base pivoted on said support and adapted to be tilted by the load on the scale, a weighing mechanism, a printing mechanism, means connected to the weighing mechanism and the printing mechanism whereby the printing mechanism may be positioned by the weighing mechanism, means to actuate the printing mechanism, connecting means between said base and said actuating means to position the actuating means, means to retain the actuating means in operative position, and means to release said actuating means.

5. In a weighing scale, a support and a pair of alined carrying wheels therefor, a base pivotally mounted on said support coaxially with said wheels and adapted to be swung down by the load on the scale, a weighing mechanism, a printing mechanism, means whereby the weighing mechanism may position the printing mechanism, means operable independent of the weighing mechanism to actuate the printing mechanism, connecting means between said base and actuating mechanism to move it to operative position when the base is swung down, means to retain said actuating mechanism in such operative position, and means to release said actuating mechanism.

6. In a weighing scale, a support, two pairs of wheels to carry the support, a base mounted co-axially with one pair of wheels to swing down until limited by the other pair, a platform and weighing mechanism connected thereto, a printing mechanism comprising type and a connection whereby the printing mechanism may be positioned by the movement of the platform relative to the base, and means positioned by the base when moving independently of said wheeled support to actuate the printing mechanism.

7. In a weighing scale, a support, a base mounted on the support to swing up and down, a weighing mechanism, a printing mechanism comprising type, means connecting the weighing mechanism and type whereby the type may be positioned by the weighing mechanism of the scale independently of the base, actuating means for said printing mechanism comprising a weight, a second weight connected to the base and elevated thereby when the base is swung down, means whereby said second weight when moving down elevates the first, means to hold the second weight in elevated position, means actuated by the first named weight to release the second, means to hold the first named weight elevated, and means to release the first named weight.

8. In a weighing scale, a support, a base mounted on the support to swing up and down, a weighing mechanism, a printing mechanism comprising type and connecting means whereby the printing mechanism may be positioned by the weighing mechanism of the scale independently of the base, actuating means for said printing mechanism comprising a weight, a second weight connected to the base and elevated thereby when the base is swung down, means whereby said second weight when moving down elevates the first, means to hold the second weight in elevated position, means actuated by the first named weight to release the second, means to hold the first named weight elevated, means to release the first named weight, and means to dampen the movements of said weights.

9. In a weighing scale, a lever mechanism and base to contain said lever mechanism, said base being tiltable in a vertical plane from a normal position to an operative position, a weight-printing mechanism embodying a type wheel and a connection whereby the printing mechanism may be positioned by the lever mechanism an impressing device, means positioned by the base to actuate the impressing device, a retainer for said actuating means when positioned by the base, and means to release the retainer.

10. In a ticket - printing - and - delivering weighing scale of the character described, the combination with a tiltable base and a platform tiltable with said base but movable relative thereto, associated weighing mechanism parts, of a plate-like main support having mounted on one side thereof a printing wheel, means operatively associating said printing wheel with the weighing mechanism, a ticket magazine, a ticket-feeding mechanism for feeding tickets from the magazine to the printing wheel, and a printing hammer, and having mounted on the opposite side of said support a system of levers for controlling the operation of the printing hammer and ticket-feeding mechanism, with operative connections extending through the support from said system of levers for operating the printing hammer, with operative connections between the base and said levers and with operative connections between the hammer mechanism and the ticket-feeding mechanism.

11. In a weighing scale, a printing device and a weighing mechanism comprising levers and a tiltable weight receiving platform, a connection whereby the printing device may be positioned by the weighing mechanism, mechanism to actuate the printing mechanism, a connection between the said weighing mechanism and said actuating mechanism to place the actuating mechanism in operating position when the weighing mechanism is loaded, means to retain said actuating mechanism when so positioned, and means to release said actuating means.

ADOLPH A. CAILLE.